July 19, 1960 B. KRALOWETZ 2,945,934
MACHINE FOR HOT-FORMING BAR STOCK
Filed Sept. 12, 1958 7 Sheets-Sheet 1

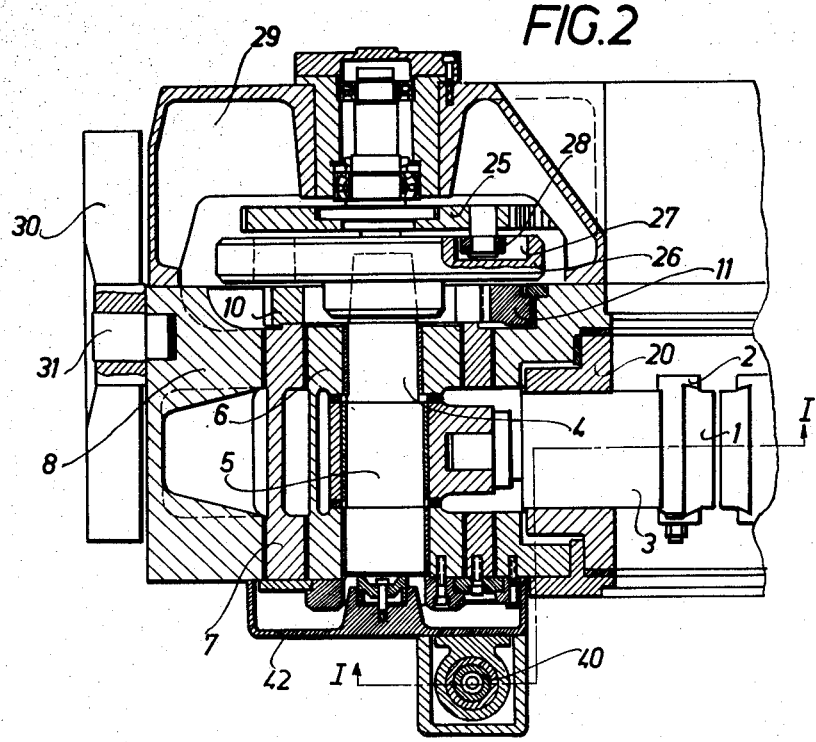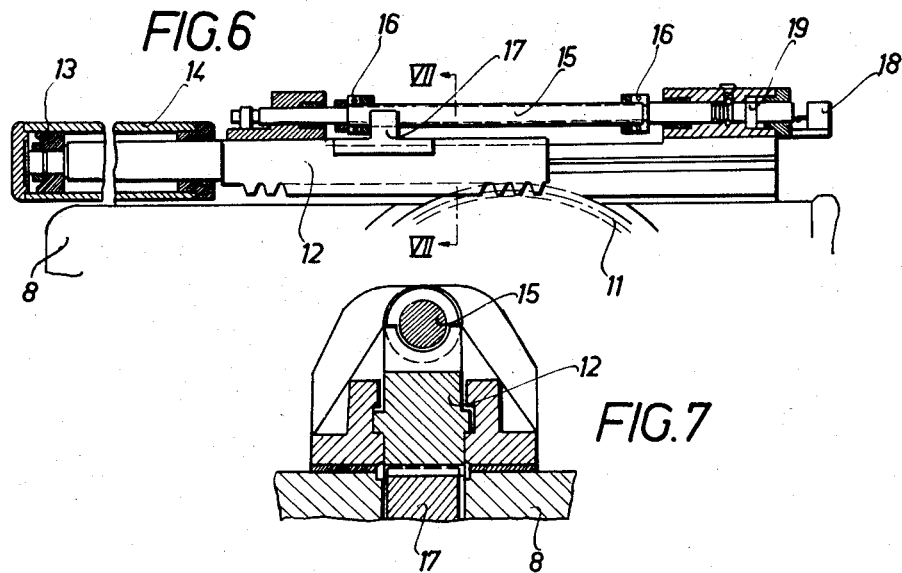

July 19, 1960

B. KRALOWETZ 2,945,934

MACHINE FOR HOT-FORMING BAR STOCK

Filed Sept. 12, 1958

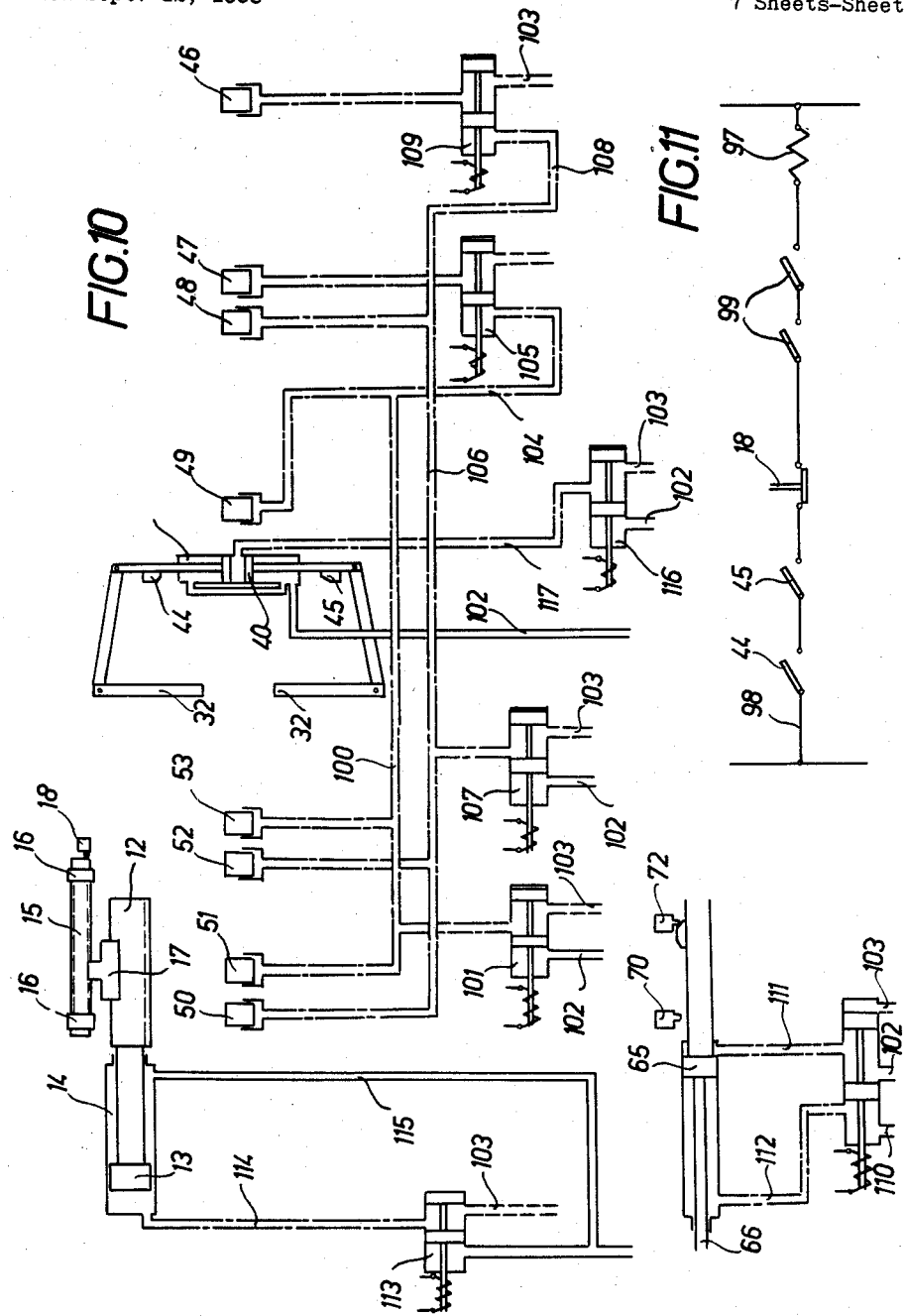

United States Patent Office 2,945,934
Patented July 19, 1960

2,945,934
MACHINE FOR HOT-FORMING BAR STOCK

Bruno Kralowetz, Retzenwinklerstrasse 13, Steyr-Gleink, Austria

Filed Sept. 12, 1958, Ser. No. 760,771

Claims priority, application Austria Sept. 14, 1957

23 Claims. (Cl. 219—7.5)

This invention relates to a machine for the continuous manufacture of drop forgings from bar stock. In hot-forming machines, such as forging machines, pendulum-type rolling mills or the like it is already known to provide directly before the forming tools an electric induction heater enclosing the path along which the stock is fed to enable a continuous working of a bar length without intermediate reheating, without need for providing feed distances from a furnace to the machine and without heat losses on such feed distances. In the previous machines of this type, however, the heating inductor is arranged to be energized in the working rhythm of the forming tools, e.g., by the feeding movement of the stock or by the forming stroke, and to be deenergized by a timer, whereby the required reliability of operation is highly endangered. As a rule, the forming operation, particularly in forming machines for smaller drop forgings, requires a much shorter time than the heating of the stock to the forming temperature by the heating inductor. When the heating inductor is energized in the working rhythm of the hot-forming means, sufficient time for an adequate heating of the stock in the heating inductor will not be available and the forming operation must be applied to stock which is too cold. This causes an overloading of the machine or unsatisfactory forging results. Even if a working cycle of the machine takes more time than the heating of the respective bar portion in the heating inductor, the correct temperature of the workpiece during the forming operation will not be ensured because the heating inductor is deenergized after a certain period of time and the stock is allowed to cool until the next feeding step and the next energization of the heating inductor. Moreover, the timed deenergization of the heating inductor does not take voltage variations and resultant changes in the temperature to which the workpiece has beeen heated into account. Finally, the frequent energization and deenergization is undesirable because it causes an intermittent shock load to be applied to the supply system. For this reason such machines having a heating inductor which is energized in dependence on the working rhythm of the forming means and deenergized by a timer are not suitable in practice.

It is an object of the invention to eliminate these disadvantages and provide a fully automatic machine, with which drop forgings or the like can be made continuously from a bar-shaped blank without danger of overheating or insufficient heating of the stock to be worked or of damage to the machine.

The machine according to the invention comprises also an electric induction heater which is arranged directly before the forming tools and surrounds the feed path of the stock and is essentially characterized in that the limited feed movement of the stock and the forming and/or setting movements of the forming tools, which working and/or setting movements are automatically discontinued after the forming operation has been completed, are positively initiated in dependence of the temperature of the stock adjacent to the heating inductor. Thus, the inductor is not energized in the working rhythm of the forming means, as before, but the working rhythm depends on the temperature rise of the stock caused by the inductor. Only when the bar portion disposed adjacent to the inductor has reached the necessary forming temperature does the feed movement begin, followed by the working and/or setting movement of the forming tools. It is obvious that the feed movement is limited and corresponds to the heated bar section and that the working and/or setting movement of the forming tools is automatically discontinued after the forming of the stock has been completed. In the meantime the next bar portion which has been fed into the range of the inductor is heated and the operations are repeated as soon as this bar portion has been heated to the forming temperature. Thus, the bar portion subjected to forming has always the appropriate temperature. In this connection it is insignificant what time is required for the heating in relation to the forming time and whether the heating time is reduced or prolonged as a result of voltage variations.

Thus, the invention provides in a broad aspect a machine for hot-forming bar stock, which comprises hot-forming tools, feeding means for feeding bar stock along a feed path to expose successive portions of said stock to said tools, and an electric induction heater disposed around said feed path before said tools, characterized by temperature-responsive means adapted to detect the temperature of said bar stock adjacent to said heater and arranged to start said feeding means when said temperature has reached a predetermined value, said feeding means when thus started being arranged to perform a forward movement whereby a portion of the bar stock is moved from a position adjacent to said heater along said feed path to expose said portion to said tools, and control means arranged to cause said tools to perform a predetermined forming action on said portion thus exposed and to retract said tools from said bar stock when said action has been completed.

It is a further object of the invention to provide a feeding means which is particularly suitable for a machine as set forth hereinbefore.

In a development of the invention a control means is provided which detects the temperature rise of the stock adjacent to the heating inductor and deenergizes the same in the case of overheating and which initiates the feeding of the stock, possibly in an indirect manner, when the forming temperature has been reached. Such a temperature control means, which is known in various constructions and for various purposes, is a relatively simple means for controlling the several switching operations in dependence on temperature as desired. As it deenergizes the heating inductor when the set maximum temperature is exceeded, an overheating which may occur under certain circumstances need not be feared whereas a too frequent energization and deenergization is avoided. On the other hand, the feeding of the stock to the forming tools at an insufficient temperature of the workpiece is safely prevented. The temperature control means could itself energize the tool or tool setting drive by means of appropriate control circuits, it is more desirable, however, if this drive is energized by the feeding means at the end of the feeding movement of the stock, which is initiated by the temperature control means. The tool movement and the setting of the tools to the workpiece may be jointly initiated and may be automatically interrupted after the forming operation has been completed. It is more desirable, however, to cause the tools to perform their movement continuously and to control only the advancing (closing) and retracting (opening) movements of the forming tools in dependence of the temperature of the workpiece adjacent to the heating inductor.

For some reason the forming tools may still engage the workpiece when the automatic feed movement of the stock is initiated by the temperature control means. In order to prevent this and the resultant danger of damage to machine parts and injury to stock which has already been formed, the temperature control means operates at least one switch included in the electrical control circuit for initiating the automatic feed movement of the stock; in series with this switch another switch is arranged, which is constructed as a limit switch, which will close only when the forming tools have been retracted from the work. Thus, when the forming temperature has been reached in the heating inductor and the first switch is thus closed by the temperature control means before the forming tools have released the workpiece and are in open position, the feed movement of the material will not be initiated because the control circuit is interrupted by the limit switch, which is responsive to the position of the tools relative to the workpiece.

In a further development of the invention the feeding means comprise stationary and forwardly and rearwardly movable tongs disposed before the heating inductor and behind the forming tools. The stationary and movable tongs are alternately closed and opened. The intercoupled movable tongs are connected to a hydraulically operable piston and the gripping jaws of all tongs can be closed with hydraulically operable pistons so that a reliable and technically simple drive means for the entire feeding means is obtained. The feeding means comprises further two limit switches, which are operated when the feed piston has reached one or the other of its end positions, and magnetically operated slide valves provided for controlling the hydraulically operated movement of the tongs and the movement of the gripping jaws are connected in such a manner that at the end of the feeding movement the previously closed gripping jaws of the movable tongs are opened by a hydraulic release of their pistons whereas the gripping jaws of the stationary tongs are closed by pressure oil admitted to their pistons and the movable tongs are returned to their initial position, whereafter the opposite opening and closing movements, respectively, of the gripping jaws are effected and the forming and/or advancing movement of the forming tools is initiated, if desired, after the feeding operation has been repeated once or several times under control of an adjustable preselector switch.

Further features of the invention will be explained more fully with reference to the accompanying drawings, which show an illustrative embodiment of the machine according to the invention.

Fig. 2 is a horizontal sectional view taken on line II—II of Fig. 1 and shows one half of the machine.

Fig. 6 is a sectional view taken on line VI—VI of Fig. 3 and showing the drive mechanism for the setting movement of the forming tools.

Fig. 7 is a transverse sectional view taken on line VII—VII of Fig. 6.

Fig. 10 is a diagrammatic showing of the hydraulic system, and

Fig. 11 is a circuit diagram showing the electrical control circuit for the automatic feeding movement of the stock.

Figure 1:
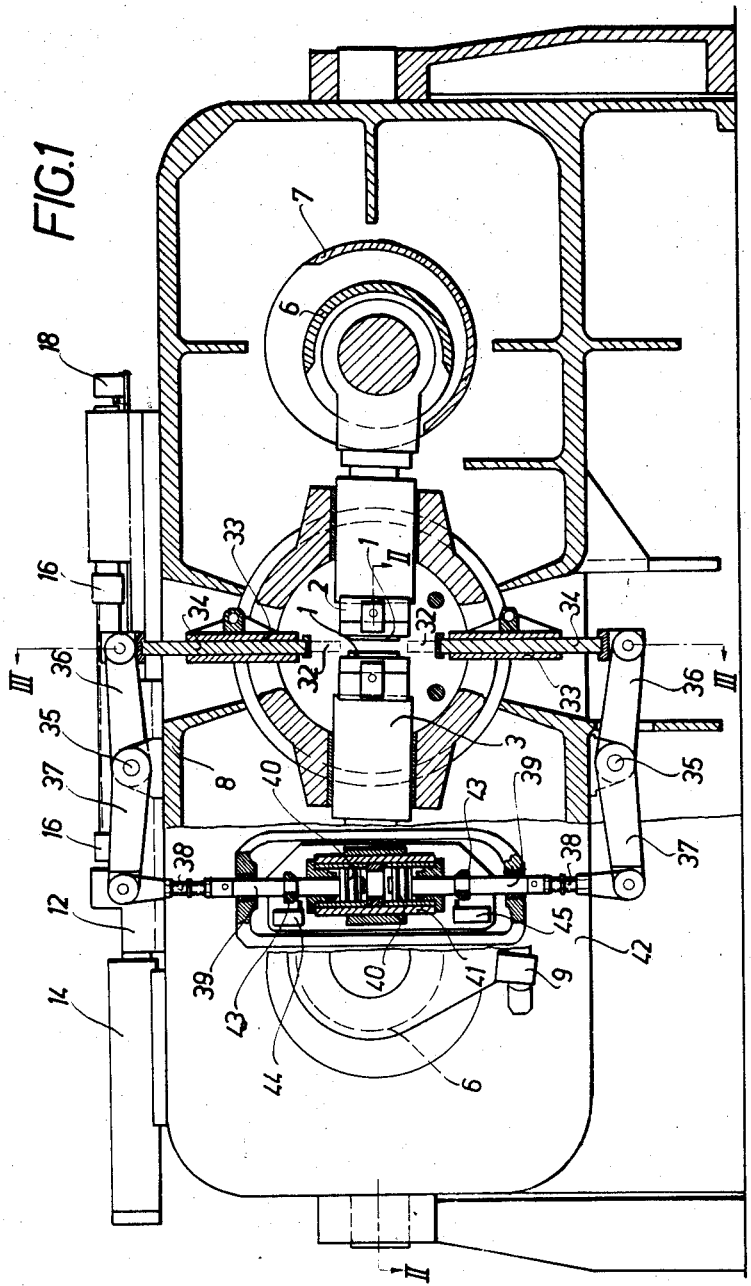
Fig. 1 is a view partly in a section taken on line I—I of Fig. 2 and showing a fully automatically operating drop forging machine seen from the stock feeding end.
Figure 3:
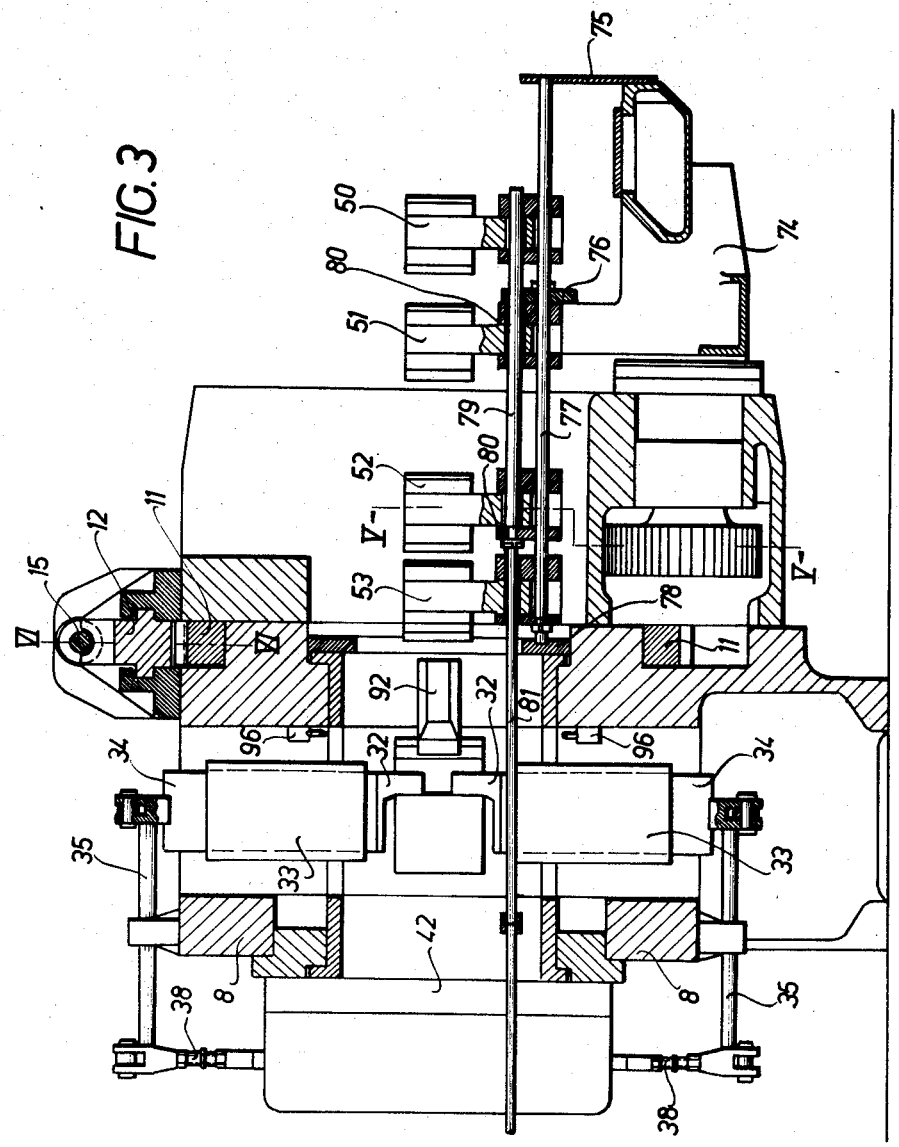
Fig. 3 is a vertical central sectional view taken on line III—III of Fig. 1 and showing the entire machine.

The forming tools of the machine consist of dies 1 and are gripped by means of a quick-acting clamp on a water-cooled die base 2. The dies 1 or die bases 2 are affixed to oppositely directed connecting rods 3, which are moved with the aid of eccentrics 5 by drive shafts 4 extending parallel to the feeding direction. The drive shafts 4 are mounted in bushings 6, which are eccentrically mounted in housing-like bushings 7. The bushings 7 are rotatable in the machine housing 8 whereas the bushings 6 are located by a ring having a radial arm 9 (left-hand half of Fig. 1) in such a manner that they will change their positions responsive to the rotation of the bushings 7, in which they are eccentrically disposed, whereas they cannot participate in the rotary adjustment of the bushings 7. The radial arm 9 is pivotally and longitudinally movably connected to the housing 8. This mounting provides two cylindrical friction surfaces for the rotary adjustment so that the increased friction causes the bushings to be self-locked against a rotation by the torques due to the reaction forces of the connecting rods. The rotation of the bearing bushings 7 cause a variation of the spacing of the axis of the drive shaft 4 from the workpiece axis and as a result also a variation of the stroke position of the connecting rods 3. Thus, the rotation of the bushings 7 causes the forming tools to be advanced to the workpiece or to be retracted therefrom.

In order to enable a rotation of the bushings 7 so as to advance the dies to the workpiece or to retract them from the workpiece, the bushings have gears 10 connected thereto, which mesh with a gear 11 mounted in the machine housing 8. The gear 11 is in mesh with a rack 12 (see particularly Figs. 6 and 7), which is slidably mounted on the machine housing 8 and is rigidly connected to a hydraulically operable piston 13 in a cylinder 14. Above the rack 12 a rod 15 is mounted, which is displaceable between two positions and the intermediate portion of which consists of a screw spindle and carries two nuts 16 as stops, which can be adjusted and clamped in position. The rack 12 is rigidly connected to a fork 17, which extends between the stops 16, which thus determine the two end positions of the rack 12. Upon a displacement of the rack 12 in the sense in which it tends to advance the forming tools to the workpiece (to the right in Fig. 6), the fork 17 engages the right-hand stop 16 and moves the rod 15 through a certain distance so that the rod 15 can act on one limit switch 18. During the opposite movement (to the left in Fig. 6, retraction of the forming tools from the workpiece) the rod 15 remains in its right-hand position, in which the end switch 18 is pressed, until the fork engages the left-hand stop 16 and retracts the rod 15, whereby the limit switch 18 is released at the end of the retracting movement of the forming tools. The function of the limit switch 18 will be explained more fully hereinafter. 19 is an oil dashpot for damping the impact at the stop.

As the connecting rods 3 perform a certain oscillatory movement as a result of the eccentric drive, they are guided in a guide 20, which is rotatable about the workpiece axis in the machine housing 8. The oscillating and rotary movements amount only to about 1° and are insignificant for the forging operation.

Figure 5:
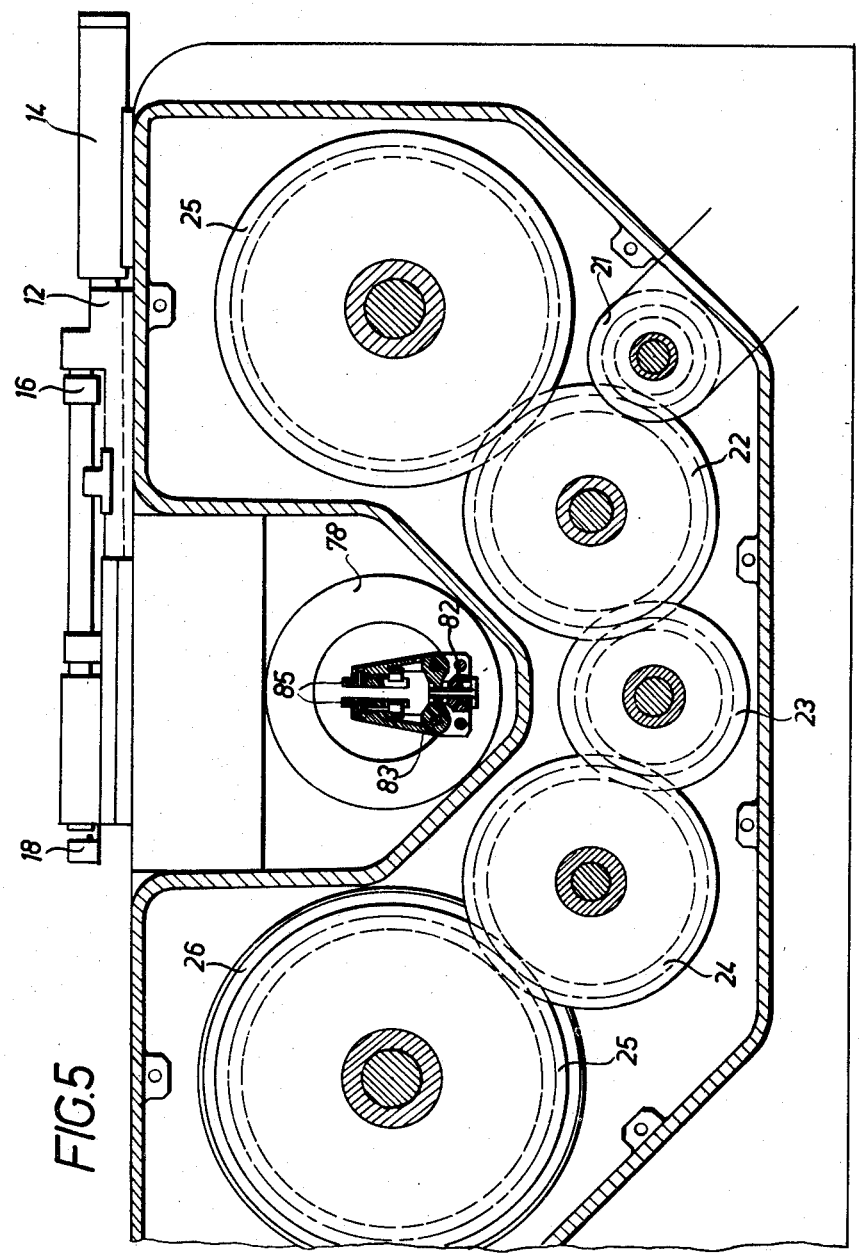
Fig. 5 is a sectional view taken on line V—V of Fig. 3 through the gearbox of the machine.

A joint drive motor (not shown) provided for driving the eccentric shafts 4, 5 drives the gear 21 (Fig. 5) through a belt and a belt pulley. The gear 21 rotates through the intermediary of idlers 22, 23, 24 three gears 25 adjacent to the eccentric shafts 4. Owing to the adjustability of the bearing bushings 7 the gears 25 are not rigidly coupled to the eccentric shafts 4 but each eccentric shaft 4 carries a flywheel 26, which is formed with a radial groove 27 engaged by a sliding block 28 carried by the associated gear 25. This coupling between the gears 25 and flywheels 26 enables a relative displacement of the axes of these wheels. The resulting offset in the drive is insignificant. The housing 8 with the gear box 29 affixed thereto is mounted for rotation about horizontal pins 31 on two standards 30 so that it can be swung through 90° after foundation bolts have been loosened. The eccentric shafts 4 and the bushings 6, 7 can then be removed in a vertical direction.

The workpiece may adhere to the dies 1 during the forming blows or during the retraction of the connecting rods; this may cause damage or prevent a further feed movement of the stock. In order to avoid this, two oppositely directed substantially fork-shaped holders 32 are disposed in the plane of symmetry between the connecting rods 3 and can be advanced to and retracted from the workpiece and grip the same at the burr which has been formed so that the workpiece is held in its central position between the dies 1. The holders 32 are affixed to carriers 34 which are slidable in pivoted guides 33. Cooling liquid is supplied to the holders 32 through a bore in the carrier 34 and the holders are provided with nozzles for spraying liquid onto the dies 1. This spraying cleans the dies from scale or the like and minimizes the tendency of the workpiece to adhere to the dies. The housing 8 rotatably mounts two parallel shafts 35, each of which carries at both ends levers 36 and 37, respectively. The levers 36 are pivoted to the supports 34 and the levers 37 are connected to the rods 39 of pistons 40 by a jointed rod 38 of adjustable length. The two pistons 40 slide in a joint cylinder 41, which is affixed to the housing cover 42. Each piston rod 39 carries an annular cam 43, whereby it acts on a limit switch 44, 45, when the two pistons 40 have reached their innermost position, in which the holders 32 are retracted from the workpiece. The function of the limit switches 44, 45 will be described more fully hereinafter and resides in preventing the initiation of the automatic stock feeding movement until the holders 32 have released the workpiece. The adjustability of the jointed rod 38 in length enables the adaptation of the end position of the holders 32 to the workpiece. This end position is determined by the closest position of the pistons 40.

The feeding means comprises two groups of four tongs 46, 47, 48, 49, 50, 51, 52 and 53, which groups are disposed before and behind the machine housing, respectively. The two middle tongs 49, 53, which are disposed next to the machine housing, are stationary, whereas the other tongs are alternately movable and stationary. This means that the tongs 46, 48, 50 and 52 can be reciprocated whereas the tongs 47, 49, 51, 53 remain in position. The first pair of tongs, considered in the sense in which the stock is introduced, i.e., the collets 46 and 47, can be arbitrarily operated independently of the performance of the function of the machine. This enables a new workpiece to be transferred to the tongs 46 and 47 when the remaining tongs still hold the preceding stock so that the continuity of the operations is ensured even when a new workpiece is introduced. Owing to the provision of four tongs behind the machine even long workpieces will be reliably guided and held when their rear end has left the front tongs.

Figure 4:
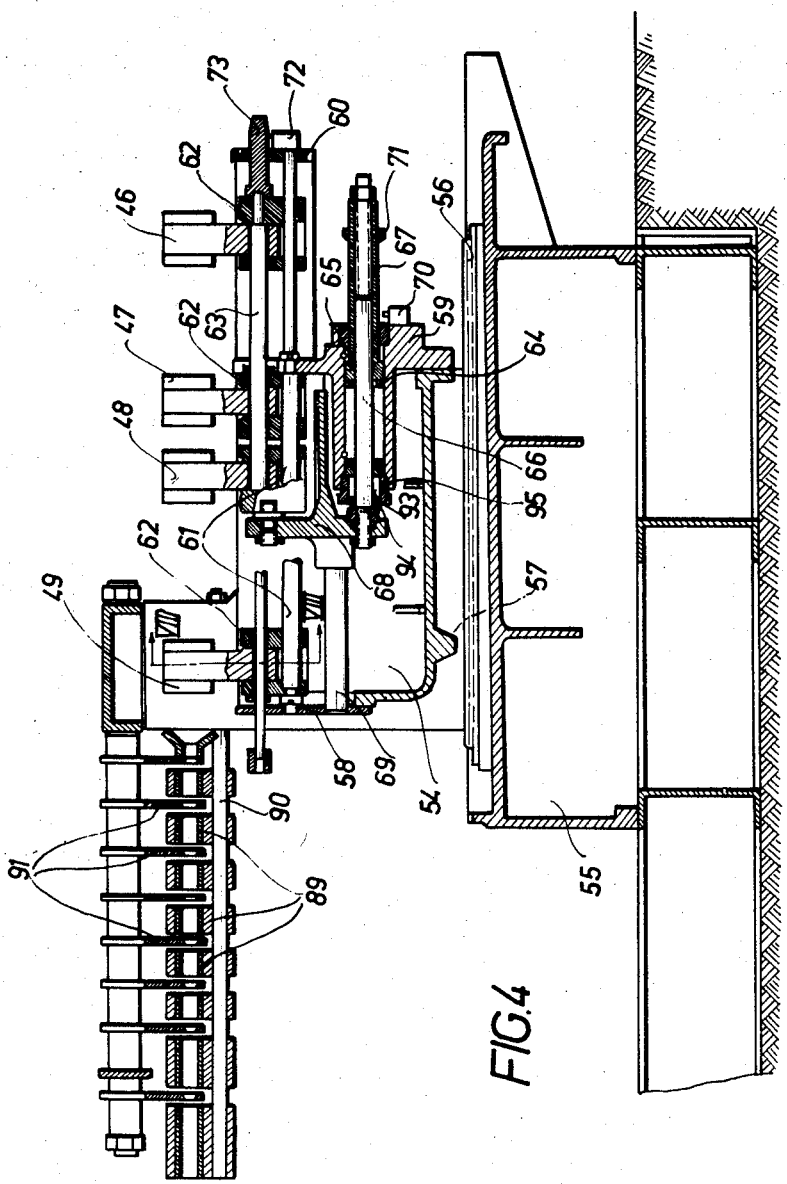
Fig. 4 is a vertical sectional view showing the front part of the feeding mechanism.

The tongs 46 to 49 disposed before the machine housing 8 are mounted on a carriage 54, which is slidable in the feed direction and which can be manually displaced on a base bed 55 by means of a rack 56 and a pinion 57 (Fig. 4). The carriage 54 comprises three fixed cross-plates 58, 59 and 60. Two rods 61 lying one beside the other are affixed in the plate 59 and centered in the plates 58 and 60. The rods 61 carry the fixed tongs 47 and 49. Bushings 62 of these fixed tongs have two further rods 63 slidably guided therein, on which the movable tongs 46, 48 are affixed. The plate 59 has a cylinder 64 cast thereon, in which a hydraulically operable piston 65 is slidable. The piston 65 is not directly rigidly connected to its piston rod 66 but carries a screw-threaded sleeve 67, which extends downwardly and is screwed there to the piston rod 66. For this reason the piston 65 can be adjusted relative to the rod 66. A further carriage 68 serves for transmitting the thrust from the piston rod 66 to the tongs 46, 48 and slides on two strong rods 69 mounted in the plates 58 and 59. The plate 59 carries a limit switch 70, which is operated by an annular cam 71 carried by the screw-threaded sleeve 67 when the piston 65 and with it the movable tongs 46, 48 are in their left-hand end position when viewed as in Fig. 4 (end of feed movement). Another limit switch 72 is adjusted by one of the rods 63 with the aid of an extension 73 at the end of return movement of the tongs and of the piston.

The tongs 50, 51, 52 and 53 arranged behind the machine housing 8 comprises a bearing frame 74 rigidly connected to the machine housing. This bearing frame carries the two cross plates 75, 76. Corresponding to the rods 61, two rods 77, which lie one beside the other and carry the fixed collets 51, 53 are affixed in the plate 76 behind the machine and are centered in the plate 75 and in a flange 78. The movable tongs 50, 52 are also affixed to two rods 79, which slide in bushings 80 of the fixed tongs and are connected by detachable coupling rods 81 to the rods 62 of the movable front tongs 46, 48. Thus, all four movable tongs 46, 48, 50, and 52 are coupled together and are connected by the carriage 68 to the piston 65.

Figure 8:
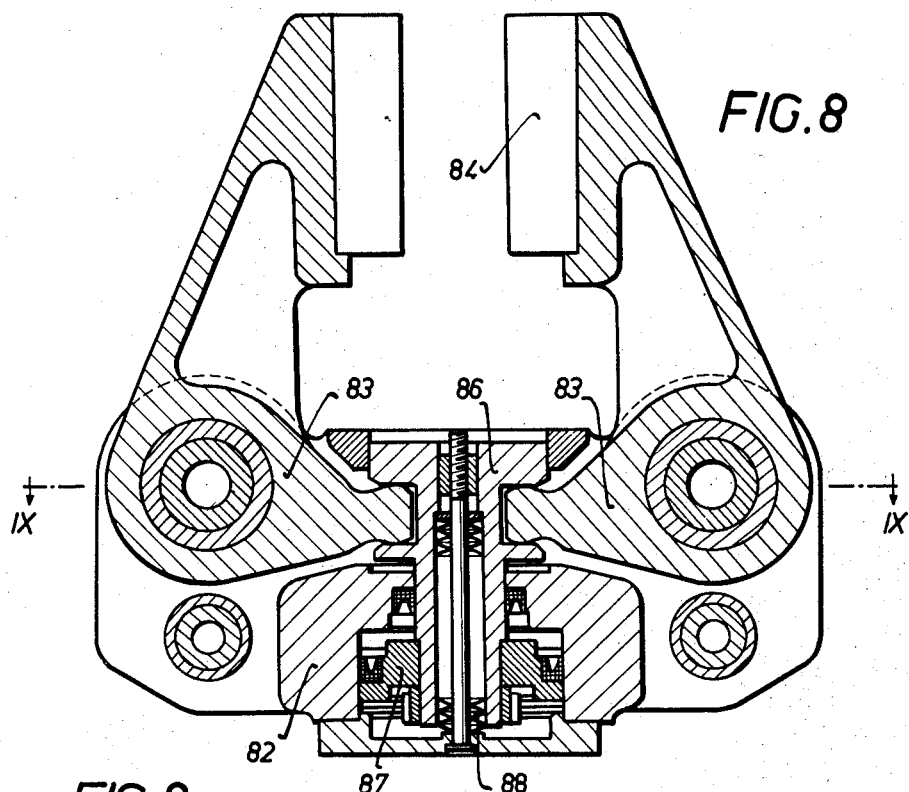
Fig. 8 is a sectional view taken on line VIII—VIII of Fig. 4 and showing a stationary tongs of the front part of the feeding mechanism.
Figure 9:
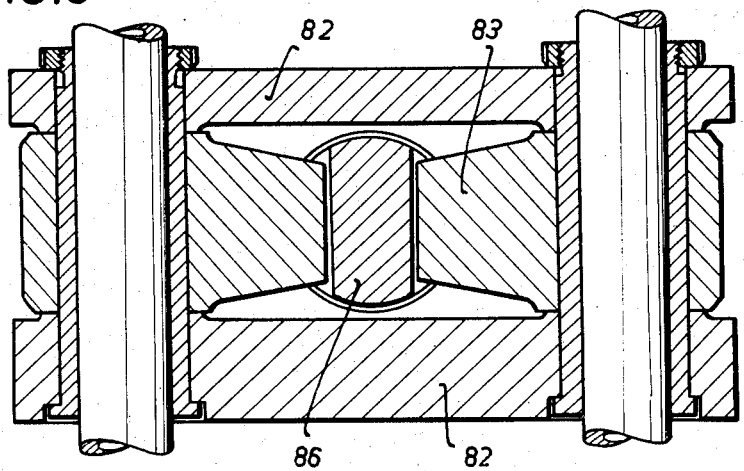
Fig. 9 is a horizontal sectional view taken on line IX—IX of Fig. 8.

All eight tongs consist essentially of a body casting 82 (see Figs. 8 and 9), two tong levers 83 having replaceable gripping jaws 84, 85, a piston rod 86 with piston 87 and a return spring 88 constructed as a plate spring set. The tong levers 83 of the movable tongs are directly pivotally mounted on the rods 63 and 79, respectively, whereas the levers of the stationary tongs are pivotally movable about the bushings 62 and 80, respectively. When pressure is applied to the top of the piston 87 the piston rod 86 will descend and close the gripping jaws and tong levers. When the admission of pressure oil to the pistons 87 is discontinued, the plate spring set 88 will urge the rod 86 upward to open the tong. The rods 61 and 63, on the one hand, and the rods 77 and 79, on the other hand, are hollow and serve for supplying the hydraulic fluid to the piston 87 and for supplying lubricant. The gripping jaws 85 of the tongs 50, 51, 52, 53 arranged behind the machine housing 8 are much higher than the gripping jaws 84 of the front tongs 46, 47, 48, 49 and are spaced from the tong levers 83 to ensure a reliable gripping even of curved workpieces leaving the forming tools and to reduce the heat transfer to the tong levers.

The carriage 54, which carries the front tongs 46, 47, 48, 49, has also adjustably affixed thereto the heating inductor 89 consisting of several coils. The several coils of the heating inductor are carried by two parallel rods 90, and guides 91 for the workpiece are provided between them. Likewise, a guide 92 is disposed behind the dies 1 and has the function of introducing the workpiece coming from the dies into the rear tongs and to protect these tongs from lateral impact stresses by the workpiece during the impacts of the connecting rods.

The carriage 54 enables the front part of the feed mechanism together with the heating inductor to be retracted from the machine housing 8 to provide room for the replacement of the forming tools and of the inductor. The adjustability of the piston 65 on the rod 66 has the purpose of varying the feed increment of the movable tongs and of the stock to be worked whereas the initial position (shown in Fig. 4) is invariably limited by a plate spring set 93, which damps the impact, in conjunction with a ring 94 and a bushing 95 screw-connected to the cylinder 64.

To enable a control of the temperature reached by the workpiece adjacent to the heating inductor 89 a temperature control means is provided, which may consist, e.g. of two pyrometers 96. This temperature control means prevents the initiation of the automatic feed movement before the forming temperature has been reached and will deenergize the heating inductor when a pre-set maximum temperature is reached.

In Fig. 11, 97 designates a relay or the like, which causes the initiation of the automatic feed movement of the stock. The control circuit 98 for this relay includes several serially arranged switches, of which the two switches 99 are closed by the two pyrometers 96 as soon as the desired forming temperature has been reached. The control circuit 98 includes also the limit switches 18 and 44, 45. Only when all these switches are closed can the relay 97 become operative and can the feeding of the stock begin. Because the limit switch 18 is closed only when the rack 12 is in its left-hand end position when viewed as in Fig. 6, the connecting rods 3 and the dies 1 being retracted from the workpiece, the beginning of the feed movement of the workpiece will depend on this position. Likewise, the limit switches 44, 45 are closed only when the pistons 40 are in their innermost position, in which the holders 32 are spaced from the workpiece. This means that the feed movement of the workpiece can take place only when the forming temperature has been reached (closed switches 99) and will also depend on the fact that the tools and holders have reached their retracted position. This ensures that the automatic feed movement of the stock will not be effected unless the other machine parts cannot interfere with the feed movement and neither the stock nor the machine can be damaged.

The entire function of the machine will now be described with reference to the diagram shown in Fig. 10, in which all those liquid conduits which are filled only with pressure oil are represented by solid lines whereas the dash and dot lines represent only discharge conduits for the hydraulic fluid and the dash lines serve alternatingly for pressure application and for discharge.

The cylinders of the stationary tongs 47, 49, 51, 53 are fed by a conduit 100, which can be connected by a magnetically operated slide valve 101 to the pressure oil conduit 102 or the discharge conduit 103 and which has a branch conduit 104 connecting it through a magnetically operated slide valve 105 to a first stationary tongs 47. A similar conduit 106 is provided for the movable tongs 46, 48, 50 and 52, and is controlled by a magnetically operated slide valve 107 and has a branch conduit 108 connecting it through a slide valve 109 to the first movable tongs 46.

To insert the workpiece into the first two tongs 46, 47, the two magnetically operated slide valves 105 and 109 are advanced under push button control or the like into the right-hand position shown, in which the conduits from the tong cylinders are connected to the discharge conduit 103 so that the tong pistons are not under hydraulic pressure and the tongs open under spring force.

In the initial position the movable tongs are closed. This means that the magnetically operated slide valve 107 is in its left-hand position, in which pressure oil from the conduit 102 can reach the conduit 106 and from there the cylinders of the movable tongs 46, 48, 50 and 52. On the other hand, the stationary tongs 47, 49, 51 and 53 are opened because the magnetically operated slide valve 101 being in its right-hand position connects the conduit 100 to the discharge conduit 103. When the feed movement is initiated a further magnetically operated slide valve 110 is moved to the right-hand position shown to connect the pressure conduit 102 to the conduit 111 leading to the right-hand end of the feed piston 66 and to connect the conduit 112 from the left-hand end of the piston to the discharge conduit 103. This shifting of the magnetically operated slide valve is first effected by hand with the aid of an appropriate electrical control means at the beginning of the operation and is subsequently effected by the relay 97 or the like. Under the action of the pressure oil admitted to the piston 66 the latter is moved from right to left and carries the movable tongs and with them the workpiece along. At the end of this feed movement the limit switch 70 is operated to cause the displacement of the magnetically operated slide valve 101 from the position shown to the left and, after a short delay, a displacement of the slide valve 107 to the right. Thus the conduit 100 is connected to the pressure conduit 102 and pressure oil is admitted to the pistons of the fixed tongs so that the latter are closed whereas the previously closed movable tongs open, their supply conduit 106 having been connected to the discharge conduit 103. As the movable tongs are opened, the magnetically operated slide valve 110 has also been restored to connect the conduit 112 to the pressure conduit 102 and to connect the conduit 111 to the discharge conduit 103. Thus the piston 66 is pushed back and the movable tongs return to their initial position.

At the end of this return movement the limit switch 72 is operated, which causes a shifting of the slide valve 107 and with it the closing of the movable tongs and after a short delay the restoring of the magnetically operated slide valve 101 with it the opening of the fixed tongs. This entire feeding cycle may be repeated once or several times if the mechanism has been pre-set accordingly with the aid of a pre-selector switch. The limit switch 72 has also the function to cause the magnetically operated slide valve 113 to be shifted to the left at the end of the feeding cycle or at the end of the last feeding cycle in order to connect the conduit 114 leading to the left-hand end of the piston 13 to the pressure conduit 115. Whereas the pressure conduit 115 leads also to the right-hand end of the piston 13, the effective piston area on the left is much larger than on the right so that a feed movement of the piston 13 will take place. It is obvious that an appropriate relief valve or the like must be incorporated in the conduit 115. Through the intermediary of the rack 12, the displacement of the piston 13 to the right causes the gear 11 and with it the gears 10 and bushings 7 to be rotated so as to advance the connecting rods 3 with the dies 1 to the workpiece (advancing movement of the forming tools). The drive of the eccentric shafts 4, 5 is started at the beginning of the operation and is not interrupted throughout the period of operation.

Together with the magnetically operated slide valve 113 the magnetically operated slide valve 116 is also adjusted to the left. As a result, pressure oil from the conduit 102 can flow through the conduit 117 to the middle of the cylinder 41 to urge the pistons 40 apart so that the holders 32 are also advanced to the workpiece. Whereas the other end of the pistons 40 is permanently exposed to the pressure conduit 102, the effective piston areas at both ends are again different.

The limit switch 18 is operated at the end of the closing movement of the connecting rods 3 and forming tools 1. After a delay caused by a timer this limit switch 18 causes the slide valve 113 to be restored so that the conduit 114 is connected to the discharge conduit 103 and pressure is applied to the piston 13 through the conduit 115 to urge the piston to the left, whereby the connecting rods and forming tools are opened. The delay is desirable because it permits the connecting rods to strike several blows on the workpiece in their closest position and thus improves the forming. At the end of the opening movement of the connecting rods the rod 15 is displaced to the left by means of the left-hand stop 16 and the forks 17 so that the limit switch 18 is released. As a result, the contact in the control circuit 98 is closed and the slide valve 116 is shifted to connect the conduit 117 to the discharge conduit 103 so that the pressure from the conduit 102 urges the pistons 40 towards each other and the holders 32 are also retracted from the workpiece. As soon as the holders 32 have reached the end position of their retracting movement the limit switches 44, 45 will be pressed so that the control circuit 98 is now closed if the workpiece has the required temperature and the pyrometers 96 have closed also the switches 99. In this case the entire cycle will be repeated, being initiated by the shifting of the slide valve 110.

Two limit switches 44, 45 are provided because the two pistons 40 may not reach their end position simultaneously and the next feed movement must not begin before both holders 32 have returned to their initial position. Where no holders are used, the mechanism thereof is rendered inoperative by a selector switch and the next cycle of operations begins immediately after the release of the limit switch 18.

It is obvious that the hydraulic conduits may include chokes, relief valves, pressure gauges etc.; that hydraulic accumulators may be used and that it is suitable to use several pumps for feeding the entire system. The electrical equipment and circuit may be designed in any desired way provided that the switching relations described are retained. The die need not consist of a single forming tool but may comprise a pre-forming die and a finishing die, if required, both dies being connected to one connecting rod.

I claim:

1. A machine for hot-forming bar stock, which comprises hot-forming tools, feeding means for feeding bar stock along a feed path to expose successive portions of said stock to said tools, an electric induction heater disposed around said feed path before said tools, temperature-responsive means adapted to detect the temperature of said bar stock adjacent to said heater and arranged to start said feeding means when said temperature has reached a predetermined value, said feeding means when thus started being arranged to perform a forward movement whereby a portion of the bar stock is moved from a position adjacent to said heater along said feed path to expose said portion to said tools, and control means arranged to cause said tools to perform a predetermined forming action on said portion thus exposed and to retract said tools from said bar stock when said action has been completed.

2. A machine as set forth in claim 1, in which said temperature-responsive means is arranged to de-energize said heater when the temperature of said bar stock adjacent to said heater exceeds a predetermined maximum temperature.

3. A machine as set forth in claim 1, in which said feeding means is arranged to operate said control means at the end of said forward movement to cause said tools to perform a predetermined forming action on said portion thus exposed.

4. A machine as set forth in claim 1, in which said tools comprise a pre-forming die and a finishing die.

5. A machine as set forth in claim 1, which comprises oppositely directed connecting rods having said tools replaceably connected thereto and eccentric shafts extending parallel to said feed path and operable to drive said connecting rods.

6. A machine as set forth in claim 1, which comprises an electric circuit energizable to start said feeding means and including a first normally open switch lying in series in said circuit and arranged to be closed by said temperature-responsive means when said portion of said bar stock adjacent to said heater has reached said predetermined temperature, and a second switch in series with said first switch and arranged to close only when said tools have been retracted from said bar stock.

7. A machine as set forth in claim 6, which comprises connecting rods carrying said tools and directed towards each other, eccentric shafts arranged to drive said connecting rods and extending parallel to said feed path, bushings rotatably mounting said shafts, a central gear operable to effect a joint rotary adjustment of said bushing to cause said tools to advance toward and to be retracted from said bar stock, depending on the sense of rotation of the gear, a hydraulically reciprocable rack in mesh with said gear, two adjustable stops arranged to limit the reciprocation of said rack, and a rod carrying said stops and movable between two positions, one of which is associated with a position of said tools in which the latter are advanced toward said bar stock, said rod being arranged to open said second switch in said one position.

8. A machine as set forth in claim 7, in which said tools are adapted to act on said bar stock to form a burr thereon and which comprises two oppositely directed, substantially forked holders disposed in the plane of symmetry between the connecting rods, which holders can be advanced toward and retracted from said bar stock to engage said bar stock at said burr and hold said bar stock centrally between said tools, said holders being also adapted to be retracted from said bar stock.

9. A machine as set forth in claim 8, which comprises two hydraulically operable holder pistons and two linkages comprising a member of adjustable length, each of said linkages connecting one of said holder pistons to one of said holders and adapted to advance the same.

10. A machine as set forth in claim 8, which comprises a common cylinder containing said holder pistons.

11. A machine as set forth in claim 9, which comprises a magnetically operated slide valve arranged to control the admission of hydraulic fluid to said holder pistons, and a limit switch arranged to be operated at the end of a forward movement of said feeding means to cause said slide valve to admit hydraulic fluid to said holder pistons so as to advance said holders, and in which said second switch when disengaged by said rod is arranged to cause said slide valve to admit hydraulic fluid to said holder pistons so as to retract said holders.

12. A machine as set forth in claim 9, in which said electric circuit comprises two additional series-connected limit switches and said holder pistons are arranged to open said limit switches unless the holder pistons are in a position in which said holders are retracted from said bar stock.

13. A machine for forming bar stock, which comprises forming tools, feeding means for feeding bar stock along a feed path to expose successive portions of said stock to said tools, connecting rods carrying said tools and directed towards each other, eccentric shafts arranged to drive said connecting rods and extending parallel to said feed path, bushings rotatably mounting said shafts, a central gear operable to effect a joint rotary adjustment of said bushing to cause said tools to advance towards and to be retracted from said bar stock, depending on the sense of rotation of the gear, a hydraulically reciprocable rack in mesh with said gear, two adjustable stops arranged to limit the reciprocation of said rack, and a rod carrying said stops and movable between two positions, one of which is associated with a position of said tools in which the latter are advanced toward said bar stock, an electric circuit energizable to start said feeding means and including a switch in series in said circuit, said switch being arranged to be opened by said rod when the same is in said one position, a piston arranged to reciprocate said rack, a magnetically operated slide valve, a limit switch arranged to be operated at the end of a forward movement of said feeding means to cause said slide valve to admit hydraulic fluid to said piston to cause said tools to advance toward said bar stock, and a timer operable by said rod and adapted to operate said limit switch to cause said slide valve to admit hydraulic fluid to said piston to cause said tools to be retracted from said bar stock.

14. A machine as set forth in claim 1, in which said feeding means comprise at least two pairs of tongs disposed adjacent to said feed path and adapted to be opened and closed to grip and release said bar stock, one of said pairs being disposed before said heater, the other of said pairs being disposed behind said tools, considered in said forward direction, one tongs of each of said pairs being stationary, the other tongs of each of said pair being reciprocable in the direction of said feed path, reciprocating means for reciprocating said reciprocable tongs in said forward direction and in a reverse direction, and tong operating means for opening and closing said tongs to cause said stationary tongs to grip and said reciprocating tongs to release said bar stock and vice versa responsive to the reciprocation of said reciprocable tongs.

15. A machine as set forth in claim 14, in which said reciprocable tongs are interconnected and said reciprocating means comprise a hydraulically operating reciprocating piston arranged to reciprocate said reciprocating tongs and said tong operating means comprise a plurality of operating pistons each of which is associated with one of said tongs, and means for admitting hydraulic fluid to each of said operating pistons to close the tongs associated therewith and for releasing hydraulic fluid from each of said operating pistons to cause the opening of the tongs associated therewith.

16. A machine as set forth in claim 15, which comprises a piston rod adjustably connected to said reciprocating piston and means accessible from the outside of the machine to effect a relative adjustment between said piston rod and said reciprocating piston.

17. A machine as set forth in claim 15, which comprises two limit switches arranged to be operated by said reciprocating piston at the ends of its path, magnetically operated slide valves for controlling the admission and release of hydraulic fluid to said reciprocating and operating pistons, and a control circuit including said limit switches and arranged to control said slide valves to admit hydraulic fluid to said reciprocating piston to cause the same to perform forward and return movements between the ends of its path and to admit hydraulic fluid to the operating pistons associated with said reciprocable tongs and to release hydraulic fluid from the operating pistons associated with said stationary tongs during a forward movement of said reciprocating piston and to release hydraulic fluid from the operating pistons associated with said reciprocating tongs and admit hydraulic fluid to the operating pistons associated with said stationary tongs during a return movement of said reciprocating piston, and control means arranged to start said tools to act on said bar stock when a forward movement of said reciprocating piston has been completed.

18. A machine as set forth in claim 17, in which said control means are arranged to start said tools to act on said bar stock when a repeated forward movement of said reciprocating piston has been completed.

19. A machine as set forth in claim 17, which comprises a selector switch adapted to control the number of forward movements of said reciprocating piston required to cause said control means to start said tools.

20. A machine as set forth in claim 14, which comprises drive means for said tools, a machine housing enclosing said tools and drive means, and eight of said tongs, four of which are arranged one behind the other before said machine housing and four of which are arranged one behind the other behind said machine housing, the two tongs next adjacent to the machine housing being stationary and the remaining tongs being alternately stationary and reciprocable, the first two of the tongs arranged before said machine housing, considered in the direction from said heater to said tools, being adapted to be manually opened and closed independently of the reciprocation of said reciprocable tongs.

21. A machine as set forth in claim 14, which comprises drive means for said tools, a machine housing enclosing said tools and drive means, a carriage movable along said feed path and carrying said heater, a hydraulic piston and cylinder unit forming part of said reciprocating means, and the tongs arranged before said heater, said machine comprising further a bearing frame affixed to said machine housing and carrying said tongs disposed behind said tools, and detachable coupling rods connecting said reciprocable tongs disposed before said heater and behind said tools.

22. A machine as set forth in claim 14, in which said tongs comprise gripping jaws adapted to grip said bar stock and tong levers adapted to operate said jaws and in which said jaws of the tongs disposed behind said tools are normally spaced from said tong levers thereof and substantially higher than the jaws of the tongs disposed before said heater.

23. A machine for hot-forming bar stock, which comprises hot-forming tools, feeding means for feeding bar stock along a feed path to expose successive portions of said stock to said tools, an electric induction heater disposed around said feed path before said tools, temperature-responsive means adapted to detect the temperature of said bar stock adjacent to said heater and arranged to start said feeding means when said temperature has reached a predetermined value, said feeding means when thus started being arranged to perform a forward movement whereby a portion of the bar stock is moved from a position adjacent to said heater along said feed path to expose said portion to said tools, drive and control means arranged to cause said tools to perform a predetermined forging action on said portion thus exposed and to retract said tools from said bar stock when said action has been completed, said drive and control means comprising connecting rods connecting said tools and directed towards each other, eccentric shafts arranged to drive said connecting rods and extending parallel to said feed path, bushings rotatably mounting said shafts, a central gear operable to effect a joint rotary adjustment of said bushing to cause said tools to advance towards and to be retracted from said bar stock, depending on the sense of rotation of the gear, a hydraulically reciprocable rack in mesh with said gear, two adjustable stops arranged to limit the reciprocation of said rack, and a rod carrying said stops and movable between two positions, one of which is associated with a position of said tools in which the latter are advanced toward said bar stock, said machine comprising further an electric circuit energizable to start said feeding means and including a first normally open switch lying in series in said circuit and arranged to be closed by said temperature-responsive means when said portion of said bar stock adjacent to said heater has reached said predetermined temperature, and a second switch in series with said first switch and arranged to be opened by said rod when the same is in said one position, a piston arranged to reciprocate said rack, a magnetically operated slide valve, a limit switch arranged to be operated at the end of a forward movement of said feeding means to cause said slide valve to admit hydraulic fluid to said piston to cause said tools to advance toward said bar stock, and a timer operable by said rod and adapted to operate said limit switch to cause said slide valve to admit hydraulic fluid to said piston to cause said tools to be retracted from said bar stock.

References Cited in the file of this patent
UNITED STATES PATENTS

| | | |
|---|---|---|
| 1,164,278 | Geisenhoner et al. | Dec. 14, 1915 |
| 2,275,763 | Howard et al. | Mar. 10, 1942 |
| 2,575,504 | Wright | Nov. 20, 1951 |
| 2,829,229 | Metz | Apr. 1, 1958 |